United States Patent [19]

Bennett, Jr. et al.

[11] 4,042,564

[45] Aug. 16, 1977

[54] METHOD FOR PREPARING POLYPHENYLENE ETHERS

[75] Inventors: James Gordy Bennett, Jr.; Glenn Dale Cooper, both of Delmar, N.Y.

[73] Assignee: General Electric Company, Pittsfield, Mass.

[21] Appl. No.: 631,191

[22] Filed: Nov. 11, 1975

[51] Int. Cl.² .............................................. C08G 65/44
[52] U.S. Cl. ................................................ 260/47 ET
[58] Field of Search .................................. 260/47 ET

[56] References Cited

U.S. PATENT DOCUMENTS

| | | | |
|---|---|---|---|
| 3,219,698 | 11/1965 | Halpern et al. | 260/576.6 |
| 3,226,361 | 12/1965 | Borman | 260/47 |
| 3,787,362 | 1/1974 | Bennett et al. | 260/47 ET |
| 3,804,865 | 4/1974 | Rutledge | 260/396 N |
| 3,817,919 | 6/1974 | Makashio et al. | 260/47 ET |

*Primary Examiner*—Lester L. Lee
*Attorney, Agent, or Firm*—William F. Mufatti; Edward A. Hedman; James V. Costigan

[57] ABSTRACT

A novel process for the preparation of polyphenylene ethers is disclosed that is based on the addition of a polyethoxylated quaternary ammonium salt to the reaction mixture.

16 Claims, No Drawings

METHOD FOR PREPARING POLYPHENYLENE ETHERS

This invention is concerned with a novel process for the preparation of polyphenylene ethers. The process is based on the addition of a polyethoxylated quaternary ammonium salt to the reaction mixture. Depending upon when the polyethoxylated quaternary ammonium salt is added, the reaction rate will be enhanced, catalyst removal from the polymer is faster and more complete, and separation of the solvent and antisolvent is facilitated.

BACKGROUND OF THE INVENTION

The polyphenylene ethers and processes for their preparation are known in the art and described in numerous publications including Hay, U.S. Pat. Nos. 3,306,874 and 3,306,875. Other procedures are described in Van Dort, U.S. Pat. No. 3,365,422, Bennett and Cooper, U.S. Pat. Nos. 3,639,656, 3,642,699, 3,733,299, 3,838,102 and 3,661,848. All of these patents are incorporated by reference.

The processes most generally used to produce the polyphenylene ethers involve the self-condensation of a monovalent phenol in the presence of an oxygen-containing gas and a catalyst. Thereafter, chelating agents have been used to extract the catalyst into an aqueous phase which can be separated from the polymer solution or simply to form a chelate with the catalyst which is soluble in the precipitating medium (if the phases are not separated before precipitation). Antisolvents have been used to cause the polyphenylene ether polymer to precipitate.

Various additives for the promotion of the self-condensation of the monovalent phenol have been disclosed which include quaternary ammonium compounds, inorganic bromides, phosphonium compounds and sulfonium compounds. While the prior art promoters have been satisfactory as reaction promoters, it has been noted that problems are still encountered in the subsequent polymer recovery procedures and in the procedures that are used to separate the reaction solvent from the antisolvent for recycling prupoeses.

It has now been found that a distinct class of polyethoxylated quaternary ammonium salts may be employed to promote polyphenylene ether polymerizations, to enhance the removal of catalyst residues and to increase the phase separation of reaction solvent and antisolvent by preventing the emulsification of the antisolvent and solvent.

Accordingly, it is a primary object of this invention to provide a promoted process for the preparation of a polyphenylene ether which contributes to the overall efficiency of the process, including the solvent recovery operations.

It is also an object of this invention to provide a novel promoted polyphenylene polymerization method.

It is also an object of this invention to provide a novel means of reducing the amount of copper catalyst residue in polyphenylene ether polymers.

It is also an object of this invention to provide a means of increasing the phase separation rate of polyphenylene ether reaction solvent and the antisolvent that is employed for the separation of a polyphenylene ether from its reaction mixture.

DETAILED DESCRIPTION OF THE INVENTION

The present invention provides a process for the preparation of a highmolecular weight polyphenylene ether having a degree of polymerization of at least 50 by oxidatively coupling a monovalent phenol having substitution in at least the two ortho positions and hydrogen or halogen in the para-position using an oxygencontaining gas, a solvent and a complex catalyst comprising a metal salt and an amine as an oxidizing agent, the improvement which comprises adding to the reaction mixture a compound of the formula:

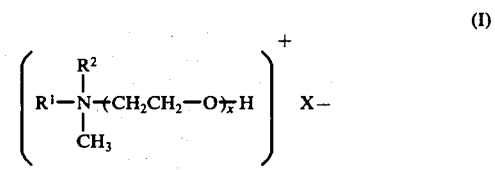

(I)

wherein $R^1$ and $R^2$ may both be alkyl of from 6–22 carbon atoms or one of $R^1$ and $R^2$ may be $-(CH_2CH_2-O-)_xH$; x is an integer of from 1 to 40. X is an anion of a strong acid such as Cl Br, $SO_4$, $PO_4$ and the like.

The polyphenylene ether resin has repeating units of the formula:

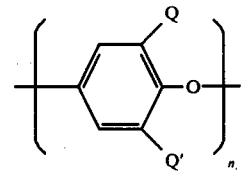

wherein the oxygen ether atom of one unit is connected to the benzene nucleus of the next adjoining unit, n is an integer of at least 50; and Q and Q' are monovalent substituents selected from hydrogen, halogen, hydrocarbon radicals, halohydrocarbon radicals having at least two carbon atoms between the halogen atom and the phenyl nucleus.

The preferred polyphenylene ether is poly(2,6-dimethyl-1,4-phenylene ether).

The process of the invention is carried out by adding the phenolic monomer to a suitable reaction solvent and preferably a copper-amine catalyst. Preferred methods of carrying out the polymerization include a cupric salt-secondary amine catalyst such as cupric chloride and di-n-butylamine or a cuprous-secondary amine catalyst. These polymerizations are advantageously carried out in the presence of an inorganic alkali metal bromide or an alkaline earth metal bromide. The inorganic bromides may be used at a level of from 0.1 mole to 150 moles per 100 moles of phenolic monomer. These materials are described in U.S. Pat. No. 3,733,299 which is hereby incorporated by reference.

Tetraalkylammonium salts may also be employed as promoters if desired. These materials are disclosed in copending application Ser. No. 485,741, which is hereby incorporated by reference. It has been found that there may be advantages to the use of tetraalkylammonium salts in the practice of the present invention. The tetraalkylammonium salts are more effective in increasing the polymerization rate than the compounds of Formula (I), while the compounds of Formula (I) are much more effective in promoting copper extraction.

The primary, secondary or tertiary amine component of the catalyst complex corresponds to those disclosed in the abovementioned Hay patents. Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and secondary and tertiary diamines. Especially preferred are mono-, di- and tri(lower) alkyl amines, the alkyl groups having from 1 to 6 carbon atoms. Typically, there can be used mono-, di- and tri-methyl, ethyl, n-propyl, i-propyl, n-butyl substituted amines, mono- and di-cyclohexylamine, ethyl-methyl amine, morpholine, N-(lower)alkyl cycloaliphatic amines, such as N-methylcyclohexylamine, N,N'-dialkylethylenediamines, the N', N'-dialkylpropanediamines, the N,N,N'-trialkylpentanediamines, and the like. In addition, cyclic tertiary amines, such as pyridine, alpha-collidine, gamma picoline, and the like, can be used. Especially useful are N,N,N'N'-tetraalkylethylenediamines, butane-diamines, and the like.

Mixtures of such primary, secondary and tertiary amines may be used if desired. A preferred mono(-lower) alkyl amine is n-butyl amine; a preferred di(-lower) alkyl amine is di-n-butylamine; and a preferred tri(lower) alkyl amine is triethyl amine. A preferred cyclic tertiary amine is pyridine. The concentration of primary and secondary amine in the reaction mixture may vary within wide limits, but is desirably added in low concentrations. A preferred range comprises from about 2.0 to 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1,500 moles of amine per 100 moles of phenol. If water is removed from the reaction, then only 10 moles of tertiary amine, e.g., trimethyl amine or triethyl amine, per 100 moles of phenol need be used as a lower limit. Even smaller amounts of di-amines, such as N,N,N',N'-tetramethylbutanediamine or N,N'di-tert-butylethylenediamine can be used, down to as low as 0.05 mole per 100 moles of phenol.

Typical examples of cuprous salts and cupric salts suitable for the process are shown in the Hay patents. These will include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts are the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirably maintained low and preferably varies from about 0.2 to 2.5 moles per 100 moles of monovalent phenol. With tertiary amines, the copper salt is preferably used in an amount providing from about 0.2 to about 15 moles per 100 moles of the monovalent phenol.

The polymerization reaction is preferably performed in a solvent. Suitable solvents are disclosed in the above-noted Hay patents. Aromatic solvents such as benzene, toluene, xylene and o-dichlorobenzene are especially preferred, although tetrachloromethane, trichloromethane, 1,2-dichloroethane and trichloroethylene may also be used.

The process for forming the polymer and the reaction conditions, such as temperature, oxygen flow rate and the like are essentially the same as the conditions disclosed in the abovementioned Hay patents, though reaction time to generate high-molecular weight polymer is reduced. The above-noted concentration ranges are preferred, though these ranges may vary to some extent depending upon oxygen flow rate, reaction temperature and the like.

The preferred types of polyethoxylated quaternary ammonium salt are those of the formula:

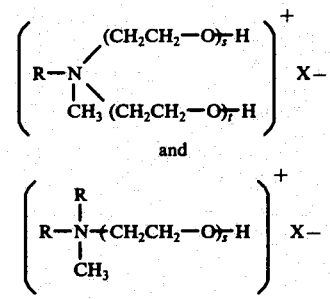

and wherein R is alkyl of 16–18 carbon atoms and $s$ and $t$ are integers of from 1–20.

These types of materials are commercially available as Ethoquads, from Armour Industrial Chemicals.

These materials are prepared by ethoxylation of amines that are prepared from mixed fatty acids of vegetable or animal origin, such as coconut oil, tallow acids or purified acids that may be isolated from these materials. While the preferred materials will be based on those materials having alkyl groups such as decyl, dodecyl, hexadecyl, octadecyl, eicosyl, etc., materials of Formula I, may include alkenyl groups such as decenyl, dodecenyl, hexadecenyl, etc., or the analogous dienyl or trienyl radicals. These materials are described in Armour Industrial Chemical Co. Bulletin F-4, Ethoquad Chemicals, which is hereby incorporated by reference.

Also, the following materials may be used in the practice of the invention:

methylbis(2-hydroxyethyl) oleylammonium chloride
methylbis(2-hydroxyethyl) octadecylammonium chloride
methylbis(2-hydroxyethyl) cocoammonium chloride
methylbispolyoxyethylene (15) cocoammonium chloride
methylpolyoxyethylene (15) dicocoammonium chloride.

The preferred manner of carrying out the present invention is to add the polyethoxylated quaternary ammonium salt at the beginning of the reaction so that advantage can be taken of its reaction promoting effect, its effect on reducing the amount of metallic residues in the polymer and its effect on the separation of the reaction solvent from the antisolvent, subsequent to the termination of the reaction. Alternately, the polyethoxylated quaternary ammonium salt may be added to the reaction mixture with a chelating agent that can be employed to terminate the polymerization. This procedure will result in a reduction in catalyst impurities that are carried over into the polyphenylene ether polymer and will exert a favorable effect on the separation of the reaction solvent from the antisolvent, on addition of water subsequent to the termination of the polymerization reaction.

The chelating agents and procedures for their use are well known. Many of these materials and procedures for their use are disclosed in U.S. Pat. No. 3,838,102 which is hereby incorporated by reference. These materials include ethylenediaminetetraacetic acid and its mono-, di-, tri- and tetrasodium salts, nitrilotriacetic acid and its mono-, di- and trisodium salts.

Particular antisolvents include hexane, cyclohexane, and lower alkanols of 1 to 6 carbon atoms such as methanol, n-propanol, i-propanol, n-butanol, n-hexanol and the like.

While it is contemplated and preferred to employ a chelating agent and antisolvent to recover the polyphenylene ether polymer from the reaction solvent, if desired, the polyethoxylated quaternary ammonium salt may be employed only for their reaction promoting effect and alternate catalyst extraction and polymer recovery techniques may be employed.

To achieve a reaction promoting effect, the polyethoxylated quaternary amine is employed at from 0.01-0.2% by weight, based on the weight of monovalent phenolic monomer. If an extraction promoting effect is desired, from 10 to 200 parts per million parts of reaction solvent may be employed. Even the lowest quantities exert a beneficial effect on the separation of the reaction solvent from the antisolvent. If desired the polyethoxylated quaternary ammonium salt may be added directly to the mixture of reaction solvent and antisolvent to aid in phase separation.

The invention also contemplates a method of enhancing the phase separation upon addition of water, of a mixture of a polyphenylene ether reaction solvent and an antisolvent for a polyphenylene ether reaction mixture. This method comprises the addition to the polyphenylene ether reaction mixture, before addition of the antisolvent for said polyphenylene ether, of from 0.001-0.2% by weight of reaction mixture of a compound of Formula I.

The phase separation of a mixture of a polyphenylene ether reaction solvent and an antisolvent is also within the scope of the invention. This method comprises adding to said mixture from 10 to 200 parts per million of polyphenylene ether reaction solvent of a compound of Formula I, adding water allowing the solvent and antisolvent to resolve into distinct phases and, thereafter, decanting the respective layers.

The amount of water employed may vary between the ratios of 0.25-2.0, preferably 0.5-1.5 (v/v based on the total mixture) although this amount is not critical.

In the separation of the solvent and non-solvent mixtures the following factors should be considered. If the toluene phase contains large amounts of methanol-water second phase distillation produces first the methanol-water-toluene azeotrope which must be removed before distillation of the toluene can begin. The effect on methanol distillation is much more serious. If a toluene second phase is present in the methanol-water phase it contains the low-molecular weight organic by-products of the reaction. When this material enters the distillation column the toluene distills off with the water and methanol. The organic by-products (mostly low molecular weight polymers) are not soluble in the methanol-water which remains, so they precipitate out, and quickly coat and plug the distillation column. It must then be shut down and cooled off and someone has to go in with pick and chisel to remove the deposits.

DESCRIPTION OF THE PREFERRED EMBODIMENTS

The following examples illustrate different procedures that utilize the beneficial effects of polyethoxylated quaternary ammonium salts on the polymerization of polyphenylene ethers. All intrinsic viscosities (I.V.) were measured in $CHCl_3$ at 30° C.

EXAMPLE 1

Catalyst was prepared by stirring 0.375g of cupric chloride and 0.585g of sodium bromide in 4 ml of methanol and 0.2g polyethoxylated quaternary ammonium salt*, then adding this mixture to a solution of 16.35g of di-n-butylamine in 50 ml of toluene to form the catalyst solution. The catalyst was transferred to a one-liter reactor equipped with an internal cooling coil, turbine blade stirrer, and ports for the addition of monomer and oxygen, 360 ml of toluene was added. Oxygen was introduced at a rate of 1.5 cu. ft./hr. to the rapidly stirred solution and a solution of 150g of 2,6-xylenol in 105g of toluene was added to the reactor over a period of 22 minutes through a Milton-Roy pump, followed by 50 ml of toluene. The temperature was maintained at 30° C for the first hour, then increased to 40° C. A small sample was withdrawn after 60 minutes, stirred with 50% aqueous acetic acid, centrifuged and the organic phase was decanted and the polymer precipitated by addition of methanol. Samples were taken at 15-minute intervals and the time required to reach an intrinsic viscosity of 0.55 dl/g was estimated from a plot of intrinsic viscosity against reaction time. This reaction was repeated once with a different polyethoxylated quaternary ammonium salt** and once without any polyethoxylated quaternary ammonium salt.

* Ethoquad 0/12 which is methylbis(2-hydroxyethyl) oleylammonium chloride.
* Ethoquad 18/12 which is methylbis(2-hydroxyethyl) octadecylammonium chloride.

The following results were obtained:

|  | I.V. (60 min.) | Time to 0.55 dl/g (min.) |
|---|---|---|
| Control | .40 | 83 |
| Run A | .44 | 75 |
| Run B | .46 | 80 |

Example 1 shows the reaction promoting effects of the polyethoxylated quaternary ammonium salt, although this effect is much clearer at the lower 2,6-xylenol concentrations such as the concentration level of Example 6.

EXAMPLE 2

Polymer was prepared from 2,6-xylenol following the procedure described in Example 1, but using as the catalyst a mixture of 0.49g of copper sulfate monohydrate and 0.57g of sodium bromide. No polyethoxylated quaternary ammonium salt was added to the catalyst. After ninety minutes 5.5g of 38% aqueous solution of the trisodium salt of ethylenediaminetetraacetic acid was added and the mixture was stirred for fifteen minutes. The polymer was precipitated by the addition of 1.7 volumes of methanol containing 5% water and separated by filtration.

A portion of the filtrate was shaken for one minute with an equal volume of distilled water and the mixture was allowed to stand. An emulsion was formed.

Phase separation was incomplete after fifteen minutes; both layers were cloudy, with a large rag layer between phases. Two other samples of the filtrate were similarly shaken with water after addition of 100 ppm, based on toluene content, of two different polyethoxylated quaternary ammonium salts*. Both separated cleanly into clear aqueous and toluene phases within 4 minutes.

* Ethoquad 0/12 which is methylbis(2-hydroxyethyl) oleylammonium chloride. Ethoquad 18/12 which is methylbis(2-hydroxyethyl) octadecylammonium chloride.

Example 2 shows the use of polyethoxylated quaternary ammonium salt in the recovery of the solvents used in the production of polyphenylene ethers. A Tesla coil and bivalent cations such as calcium and magnesium chloride have been ineffective in cracking the emulsions that are formed by the solvent-antisolvent mixture.

EXAMPLE 3

PPO reaction mixture was prepared as described in Example 1, with a cupric chloride-sodium bromide catalyst, and with no quaternary salt added. Three 25 g portions were weighed into screw-capped bottles. 100 ppm of a tetraalkylammonium salt quaternary ammonium salt* was added to one of the samples, 100 ppm of polyethoxylated quaternary ammonium salt** to another; then 0.16g of a 19% aqueous solution of the trisodium salt of EDTA was added to each, the bottles were sealed, shaken mechanically for one minute, and immediately precipitated by the addition of 50 ml of 95% methanol. The polymers were filtered off, washed once with 25 ml of 95% methanol, and the copper content determined by atomic absorption spectroscopy:

| Additive | Cu in Polymer (ppm) |
| --- | --- |
| quaternary ammonium salt | 390 |
| polyethoxylated quaternary ammonium salt | 50 |
| control | 410 |

Example 3 shows that the use of polyethoxylated quaternary ammonium salt enhances the rate of copper extraction by the trisodium salt of ethylenediaminetetraacetic acid.

* Aliquat 336 which is methyltrioctylammonium chloride.
** Ethoquad 0/12 which is methylbis(2-hydroxyethyl) oleylammonium chloride.

EXAMPLE 4

315g of 2,6-xylenol dissolved in an equal weight of toluene was added over a period of fifteen minutes to a stirred one-gallon reactor containing 0.8g of N,N'-di-tert-butylethylene diamine, 4.5g of butyldimethylamine, and 24 ml of a solution made by adding 8.58 g of bromine to 100 ml of methanol containing 1.23g of basic cupric carbonate and 13.1g of 2,6-xylenol. A rapid stream of oxygen was introduced near the bottom of the vessel during and after the addition. Reaction was continued for a total of 75 minutes. The mixture was stirred with 5.4g of 38% aqueous trisodium salt of EDTA and 15 ml of water and the polymer was precipitated by the addition of 1.75 volumes of 95% methanol. Three 45 ml portions of the filtrate were transferred to screw-capped bottles and small amounts of a 1% solution of polyethoxylated quaternary ammonium salt*, enough to provide a concentration of 30 and 150 ppm of ethoxylated amine based on toluene content of the mixture, were added to two of the bottles. 30 ml of distilled water were added to each bottle and the mixtures were shaken vigorously for one minute and the time required for complete phase separation was measured.

* Ethoquad 0/12 which is methylbis(2-hydroxyethyl) oleylammonium chloride.

| Concentration of Polyethoxylated Quaternary Ammonium Salt (ppm in toluene) | Time to Decant (minutes) |
| --- | --- |
| none | 40 |
| 150 | 8 |
| 30 | 2 |

Example 4 demonstrates the efficiency of the polyethoxylated quaternary ammonium salt in promoting phase separation of mixtures of the polyphenylene ether reaction solvent and antisolvent.

EXAMPLE 5

A poly(2,6-dimethyl-1,4-phenylene ether) reaction mixture, polymerized at 20% solids with a $CuCl_2$-NaBr-DBA catalyst at a ratio of 300:1:40, and then contacted with an aqueous solution of the trisodium salt of EDTA (1.4:1 ratio EDTA:Cu) was used for this example. The mixture contained 70 ppm (based on toluene) of methyltrioctylammonium chloride. A 50g portion of the reaction mixture was placed in a sealed bottle and shaken by hand for 30 seconds, then precipitated with 100 ml of 95% methanol. The polymer was filtered off, reslurried with 100 ml of methanol, filtered and dried. A polyethoxylated quaternary ammonium salt* (100 ppm based on toluene) was added to a second 50g portion of the mixture and it was shaken and the polymer isolated in the same way. A third portion was vigorously mixed for 10 minutes with an homogenizer before precipitation. Copper contents of the polymers were:

| Additive | Cu in Polymer (ppm) |
| --- | --- |
| none | 20 ppm |
| 100 ppm polyethoxylated quaternary ammonium salt | 10 ppm |
| homogenized 10 min. | 10 ppm |

Example 5 demonstrates the efficiency of polyethoxylated quaternary ammonium salt in promoting Cu extraction and that with it copper concentrations can be obtained with gentle mixing and a short residence time which are as low as those obtainable with very efficient mixing and long residence times.

* Ethoquad 0/12 which is methylbis(2-hydroxyethyl) oleylammonium chloride.

EXAMPLE 6

Catalyst was prepared by stirring 0.15g of polyethoxylated quaternary ammonium salt**, 0.375g of cupric chloride, and 0.585g of sodium bromide in 6 ml of methanol. The mixture was added to a solution of 16.35g of di-n-butylamine in 50 ml of toluene and stirred for 5 minutes. The catalyst solution was transferred to a one-liter reactor equipped with a cooling coil and reflux condenser and stirred with a 2½ inch turbine blade stirrer. 450 ml of toluene was added, a rapid stream of oxygen was introduced near the bottom of the vessel, and a solution of 105g of 2,6-xylenol in 123 ml of toluene was added through a metering pump over a period of 15 minutes after which 50 ml of toluene was added through the pump. The temperature was held at 30° C. Small samples were withdrawn at 60, 75 and 90 minutes after the start of reaction. The samples were shaken vigorously with an excess of 38% aqueous solution of the trisodium salt of ethylenediaminetetraacetic acid and the polymer was precipitated by addition of methanol. For comparison another polymerization was carried out in the same way, but with 0.15g of a quaternary ammonium salt* in place of the polyethoxylated quaternary ammonium salt. A third comparison experiment was carried out in the same way, but with no quaternary salt added. Results are listed below:

| Additive | I.V. dl/g | | | Time to 0.55 dl/g |
|---|---|---|---|---|
| | 60 min. | 75 min. | 90 min. | |
| polyethoxylated quaternary ammonium salt* | .45 | .54 | .60 | 76 min. |
| quaternary ammonium salt** | .50 | .59 | .62 | 69 min. |
| Control | .34 | .49 | .53 | 92 min. |

Example 6 shows the reaction promoting effect of the polyethoxylated quaternary ammonium salt. This effect is more pronounced than at the higher 2,6-xylenol concentration of Example 1 (17% solids vs. 15% solids).
** Etoquad 2C/25 which is methylpolyoxyethylene (15) dicocoammonium chloride.
*Aliquat 336 which is methyltrioctylammonium chloride.

EXAMPLE 7

2,6-xylenol was polymerized following the procedure described in Example 6 with no quaternary ammonium salt added. After 90 minutes, three 50 gram portions of the reaction mixture were transferred to screw-capped bottles, with enough 38% aqueous trisodium EDTA to provide a 1.5:1 ratio of EDTA: Cu. One of the bottles contained enough quaternary ammonium salt** (added as a 1% solution in toluene) to make the concentration 100 ppm based on toluene present, another contained 100 ppm polyethoxylated quaternary ammonium salt*. The bottles were shaken for one minute and the polymer immediately precipitated by addition of 100 ml methanol. The polymers were re-slurried once with 50 ml of methanol and washed on the filter with 100 ml of methanol.
* Etoquad 2C/25 which is methylpolyoxyethylene (15) dicocoammonium chloride.
** Aliquat 336 which is methyltrioctylammonium chloride.

The copper content of the polymers is listed below:

| Additive | Cu (ppm) |
|---|---|
| None | 2300 |
| quaternary ammonium salt | 118 |
| polyethoxylated quaternary ammonium salt | 18 |

EXAMPLE 8

Polymerization was carried out following the procedure of Example 6, with 0.15g of polyethoxylated quaternary ammonium salt or of a mixture of polyethoxylated quaternary ammonium salt and methyltrioctylammonium chloride was added. At 75 minutes after the beginning of reaction the oxygen flow was stopped and 4.0g of a 38% solution of the trisodium salt of ethylenediaminetetraacetic acid was added with 18 ml of water. The mixture was stirred gently for 15 minutes, then drawn off, centrifuged, and the upper layer separated by decantation. The polymer was precipitated by addition of 1.7 volumes of methanol, filtered, washed once with methanol and dried. Intrinsic viscosities and copper content of the polymers are shown below:

| Polyethoxylated quaternary amine salt | (g) | Methyltrioctylammonium chloride (g) | I.V. (dl/g) | Copper (ppm) | Heavy Phase |
|---|---|---|---|---|---|
| Ethoquad 0/12 | .15 | — | .54 | <5 | cloudy |
| Ethoquad 18/12* | .15 | — | .57 | <5 | cloudy |
| Ethoquad 18/25** | .15 | — | .55 | <5 | cloudy |
| Ethoquad C/12*** | .15 | — | .54 | <5 | cloudy |
| Ethoquad 0/12 | .05 | .10 | .54 | <5 | clear |
| 0/12 | .075 | .075 | .61 | <5 | clear |

*methylbis(2-hydroxyethyl) octadecylammonium chloride.
**methylbispolyoxyethylene (15) octadecylammonium chloride.
***methylbis(2-hydroxyethyl) cocoammonium chloride.

This example shows that excellent copper extraction is obtained with all the polyethoxylated quaternary ammonium salt, and that a mixture of polyethoxylated quaternary ammonium salt with methyltrioctylammonium chloride may be used without sacrifice of reaction rate or efficiency of copper removal. Such mixtures have the advantage that they produce a clear heavy phase when centrifuged, facilitating subsequent treatment to clean up this waste stream before it is discharged.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. In a process for the preparation of a high-molecular weight polyphenylene ether having a degree of polymerization of at least 50 by oxidatively coupling a monovalent phenol having substitution in at least the two ortho positions and hydrogen or halogen in the para-position, using an oxygen-containing gas, a solvent and a complex catalyst comprising a metal salt and an amine as an oxidizing agent, the improvement which comprises adding to the reaction mixture from 0.001 to 0.2 percent by weight of reaction mixture a compound of the formula:

$$\left( \begin{array}{c} R^2 \\ | \\ R^1-N+CH_2CH_2-O\!\!\!+_{\overline{x}}H \\ | \\ CH_3 \end{array} \right)^+ X^- \qquad (I)$$

wherein $R^1$ and $R^2$ may both be alkyl of from 6–22 carbon atoms or alkenyl of from 10–22 carbon atoms or one of $R^1$ and $R^2$ may be $-(CH_2CH_2-o-)_xH$; $x$ is an integer of from 1 to 40.

2. A process as defined in claim 1 wherein the polyphenylene ether has repeating units of the formula:

wherein the oxygen ether atom of one unit is connected to the benzene nucleus of the next adjoining unit, n is an integer of at least 50; and Q and Q' are monovalent substituents selected from hydrogen, halogen, hydrocarbon radicals, halohydrocarbon radicals having at least two carbon atoms between the halogen atom and the phenyl nucleus.

3. A process as defined in claim 2 wherein said polyphenylene ether is poly(2,6-dimethyl-1,4-phenylene ether).

4. A process as defined in claim 3 wherein said reaction mixture also includes an alkali metal bromide or an alkaline earth metal bromide.

5. A process as defined in claim 4 wherein said reaction is carried out in the presence of a complex catalyst comprising a cupric salt or a cuprous salt and a diamine.

6. A process as defined in claim 2 wherein the compound of formula I is employed in an amount of from 0.01–0.2% by weight of monovalent phenol.

7. A process as defined in claim 5 wherein said reaction promoter is a compound of the formula:

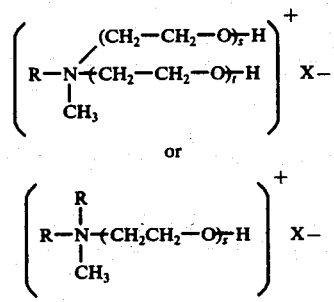

or

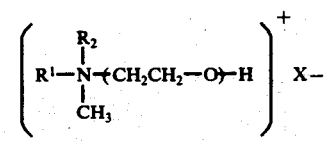

wherein R is alkyl of 16–18 carbon atoms and s and t are integers of from 1–20.

8. In a process for the preparation of a high-molecular weight polyphenylene ether having a degree of polymerization of at least 50 by oxidatively coupling a monovalent phenol having substitution in at least the two ortho positions and hydrogen or halogen in the para-position, using an oxygencontaining gas, a solvent and a complex catalyst comprising a copper salt and an amine as an oxidizing agent, a copper chelating agent for the termination of the reaction after the polyphenylene ether reaches the desired molecular weight, the improvement which comprises adding to the reaction mixture, when the polyphenylene ether reaches the desired molecular weight, an extraction promoting amount of a compound of the formula:

(I)

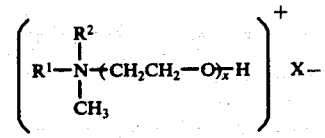

wherein $R^1$ and $R^2$ may both be alkyl of from 6–22 carbon atoms or alkenyl of from 6–22 carbon atoms or one of $R^1$ and $R^2$ may be $-(CH_2CH_2-O-)_xH$; $x$ is an integer of from 1 to 9. A process as defined in claim 8 wherein the polyphenylene ether is of the formula:

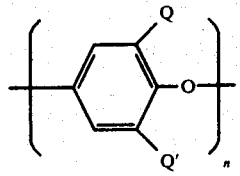

wherein the oxygen ether atom of one unit is connected to the benzene nucleus of the next adjoining unit, n is an integer of at least 50; and Q and Q' are monovalent substituents selected from hydrogen, halogen, hydrocarbon radicals, halohydrocarbon radicals having at least two carbon atoms between the halogen atom and the phenyl nucleus.

10. A process as defined in claim 8 wherein said polyphenylene ether is poly(2,6-dimethyl-1,4-phenylene ether).

11. A process as defined in claim 10 wherein said reaction mixture also includes an alkali metal bromide or an alkaline earth metal bromide.

12. A process as defined in claim 10 wherein said reaction mixture is carried out in the presence of a complex catalyst comprising a cupric salt and a secondary amine.

13. A process as defined in claim 8 wherein the compound of formula I is employed in an amount of 10–200 parts per million parts of solvent.

14. A process as defined in claim 8 wherein after the addition of the chelating agent and the compound of formula I, the polyphenylene ether resin is recovered from the reaction mixture by the addition of a non-solvent.

15. A method of enhancing the phase separation upon addition of water of a mixture of a polyphenylene ether reaction solvent and an antisolvent for a polyphenylnene ether reaction mixture, said method comprising adding to the polyphenylene ether reaction mixture, before addition of the antisolvent for said polyphenylene ether, of from 0.001–0.2 percent by weight of reaction mixture of a compound of the formula:

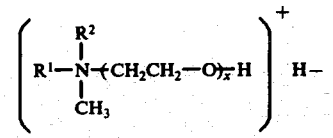

wherein $R^1$ and $R^2$ may both be alkyl of from 6–22 carbon atoms or alkenyl of from 6–22 carbon atoms or one of $R^1$ and $R^2$ may be $-(CH_2CH_2-O-)_xH$; $x$ is an integer of from 1–40.

16. A method of carrying out the phase separation of a mixture of polyphenylene ether reaction solvent and an antisolvent, said method comprising adding to said mixture from 10 to 200 parts per million parts of polyphenylene ether reaction solvent of a compound of the formula:

wherein $R^1$ and $R^2$ may both be alkyl of from 6–22 carbon atoms or alkenyl of from 6–22 carbon atoms or one of $R^1$ and $R^2$ may be $-(CH_2CH_2-O-)_xH$; $x$ is an integer of from 1 to 40; adding water, then allowing the solvent and antisolvent to resolve into distinct phases and thereafter decanting the respective layers.

* * * * *

UNITED STATES PATENT AND TRADEMARK OFFICE
CERTIFICATE OF CORRECTION

PATENT NO. : 4,042,564
DATED : August 16, 1977
INVENTOR(S) : Bennett, Jr. et al.

It is certified that error appears in the above-identified patent and that said Letters Patent are hereby corrected as shown below:

Col. 1, line 45, change "pruposes" to --purposes--

Col. 2, line 26, after "Cl" insert --,--

Col. 6, line 27, "150g" should be --105g--

Col. 6, line 43, before "Ethoquad 18/12" "*" should read --- ** ---.

Col. 9, line 26, "Etoquad" should be --Ethoquad--

Signed and Sealed this

Twenty-fifth Day of April 1978

[SEAL]

Attest:

RUTH C. MASON
Attesting Officer

LUTRELLE F. PARKER
Acting Commissioner of Patents and Trademarks